United States Patent [19]

Takuma et al.

[11] Patent Number: 4,833,541
[45] Date of Patent: May 23, 1989

[54] IMAGE SENSING APPARATUS HAVING FUNCTION OF AUTOMATICALLY MATCHING FOCUS AND EXPOSURE IN RESPONSE TO VIDEO SIGNAL

[75] Inventors: Masao Takuma, Toyanaka; Kiyotada Kawakami, Osaka, both of Japan

[73] Assignee: Sanyo Electric Co., Ltd., Osaka, Japan

[21] Appl. No.: 238,890

[22] Filed: Aug. 31, 1988

[30] Foreign Application Priority Data

Sep. 7, 1987 [JP] Japan .............................. 62-223380
Dec. 18, 1987 [JP] Japan .............................. 62-322546

[51] Int. Cl.⁴ .......................................... H04N 5/238
[52] U.S. Cl. ..................................... 358/227; 358/228
[58] Field of Search ................... 358/227, 228, 213.13, 358/213.19, 909, 87

[56] References Cited

U.S. PATENT DOCUMENTS

| | | | |
|---|---|---|---|
| 4,396,951 | 8/1983 | Tanaka | 358/228 |
| 4,531,158 | 7/1985 | Murakami et al. | 358/227 |
| 4,591,919 | 3/1986 | Kaneda et al. | 358/227 |
| 4,614,975 | 9/1986 | Kaite | 358/227 |
| 4,638,364 | 1/1987 | Hiramatsu | 358/227 |
| 4,714,966 | 12/1987 | Saito et al. | 358/228 |
| 4,734,777 | 6/1987 | Okino et al. | 358/213.19 |

FOREIGN PATENT DOCUMENTS

62-296673 12/1987 Japan .

*Primary Examiner*—Jin F. Ng
*Assistant Examiner*—Mehdi Haghani
*Attorney, Agent, or Firm*—Peter L. Michaelson

[57] ABSTRACT

In a video camera, a level of a high frequency component and a luminance level of a video signal in the same area set on a picture are detected to find a focus evaluating value and an exposure evaluating value. Automatic focusing control and automatic iris control are performed in response to these evaluating values. When it is determined that the detected exposure evaluating value fluctuated over a predetermined width or more, an automatic focusing operation is immediately stopped and performed again from the beginning if the automatic focusing operation is being performed, while the automatic focusing operation is prohibited from being started if the automatic focusing operation is being stopped.

14 Claims, 4 Drawing Sheets

IMAGE SENSING APPARATUS HAVING FUNCTION OF AUTOMATICALLY MATCHING FOCUS AND EXPOSURE IN RESPONSE TO VIDEO SIGNAL

BACKGROUND OF THE INVENTION

1. Field of the Invention

The present invention relates generally to an image sensing apparatus, and more particularly, to an improvement of an image sensing apparatus such as a video camera having a function of automatically matching focus and exposure in response to a video signal obtained from an image sensor.

2. Description of the Prior Art

Conventionally, in an automatic focusing apparatus used in an image sensing apparatus such as a video camera, an approach utilizing a video signal itself obtained from an image sensor for evaluating a state in which the focus is controlled has been developed. According to such an approach, a lot of good characteristics can be obtained. For example, there exists substantially no parallax. In addition, even if the depth of field is small and an object is located in the distance, the focus can be precisely matched. Furthermore, according to this approach, a specific sensor for automatic focusing need not be separately provided, so that the apparatus is very simple as a mechanism.

As one example of such a focus control method utilizing a video signal, a control method referred to as a so-called hill-climbing servo system has been conventionally known. Briefly stated, in this hill-climbing servo system, digital data obtained by A-D converting a level of a high frequency component of a video signal obtained from an image sensor within the range of a focusing area set in the center of a picture is accumulated every one field using an accumulating circuit. The obtained digital data corresponding to one field is held in a memory as a focus evaluating value, the focus evaluating value is always compared with a focus evaluating value detected one field before, and the relative position of a focusing lens and an image sensor continues to be slightly vibrated such that the focus evaluating value always takes the maximal value. An automatic focusing apparatus which performs hill-climbing control by setting a sampling area in the center of a picture is disclosed in, for example, U.S. Pat. No. 4,614,975.

On the other hand, as automatic stop-down control of an image sensing apparatus such as a video camera, so-called automatic iris control, servo control is performed using as an exposure evaluating value the average value or the peak value of a level of a luminance signal of a video signal obtained from an image sensor such that the illuminance of a picture becomes constant. In such automatic iris control, considering a case in which a video signal is detected over the entire picture and used as an exposure evaluating value, if a bright object such as the sky exists in the picture, the amount of light is lacking with respect to an object in an area other than the sky, so that the picture becomes so dark to be hard to see. As methods for solving such a problem, there have been proposed a system of extracting only a signal in the central portion of a picture using a wide blanking pulse and a system in which a part of a picture is weighed, as compared with the other area, as an area for measuring light. Particularly, Japanese Patent Laying-Open Gazette No. 296673/1987 discloses a system of setting a detection area in a particular position of a picture.

Meanwhile, in the above described conventional automatic focusing apparatus, automatic focusing control is performed such that a focus evaluating value obtained from a level of a high frequency component of a video signal always becomes the maximum. The absolute value of the level of the high frequency component of the video signal changes depending on the degree of defocusing from the in-focus position, and changes depending on the type and the brightness of an object.

Thus, considering a case in which the distance between a lens and an object does not change, when the object moves outside the range of a focusing area set in the picture, or when the brightness of the object changes due to the change in ambient light, a focus evaluating value changes, whereby an automatic focusing operation is erroneously started. If such a malfunction of automatic focusing control occurs, the picture becomes unclear due to unnecessary movement of the lens.

In order to solve such a problem, a system has been proposed which separately determines the change in object by detecting a value of the aperture of a lens and prevents a malfunction of automatic focusing by disabling an automatic focusing operation in response to the result of determination, which is disclosed in U.S. Pat. No. 4,531,158.

However, even in this method, it is not necessarily possible to obtain a good picture by preventing a malfunction. More specifically, if a sampling area for automatic focusing and a sampling area for automatic iris do not coincide with each other, it is impossible to obtain exposure most suitable for an object simultaneously with focusing of the object, so that automatic focusing control is unnecessarily affected due to the change in brightness of an area other than the object.

SUMMARY OF THE INVENTION

Therefore, an object of the present invention is to provide an image sensing apparatus which can satisfactorily perform automatic focusing control and automatic iris control so that the amount of light most suitable for an object which is precisely focused can be obtained.

Another object of the present invention is to provide an image sensing apparatus which prevents a malfunction of automatic focusing even if the brightness of an object changes, thereby to prevent an unclear picture due to unnecessary movement of a lens.

Briefly stated, tee image sensing apparatus according to the present invention detects every constant time period a level of a high frequency component of a video signal obtained from an image sensor in a particular area set on an image sensed picture and converts the detected level into a focus evaluating value to supply the same and detects every constant time period a luminance level of the video signal obtained from the image sensor in the same area and converts the detected level into an exposure evaluating value to supply the same, and performs automatic focusing control in response to the obtained focus evaluating value such that the positional relation of a focusing lens relative to an image sensor is maintained in an in-focus state and performs automatic iris control in response to the obtained exposure evaluating value such that the amount of light which is incident on the image sensor is held to be the most suitable reference amount of light.

In accordance with another aspect of the present invention, when the exposure evaluating value fluctuated over a predetermined width, the automatic focusing operation is prohibited.

A principal advantage of the present invention is that automatic focusing control and automatic iris control are performed in response to a video signal obtained from an image sensor in the same area on a picture, so that an object can be precisely focused and the amount of light most suitable for the object can be obtained.

Another advantage of the present invention is that the change in brightness of an object is determined in response to fluctuations in exposure evaluating value, so that an unnecessary automatic focusing operation can be prevented.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
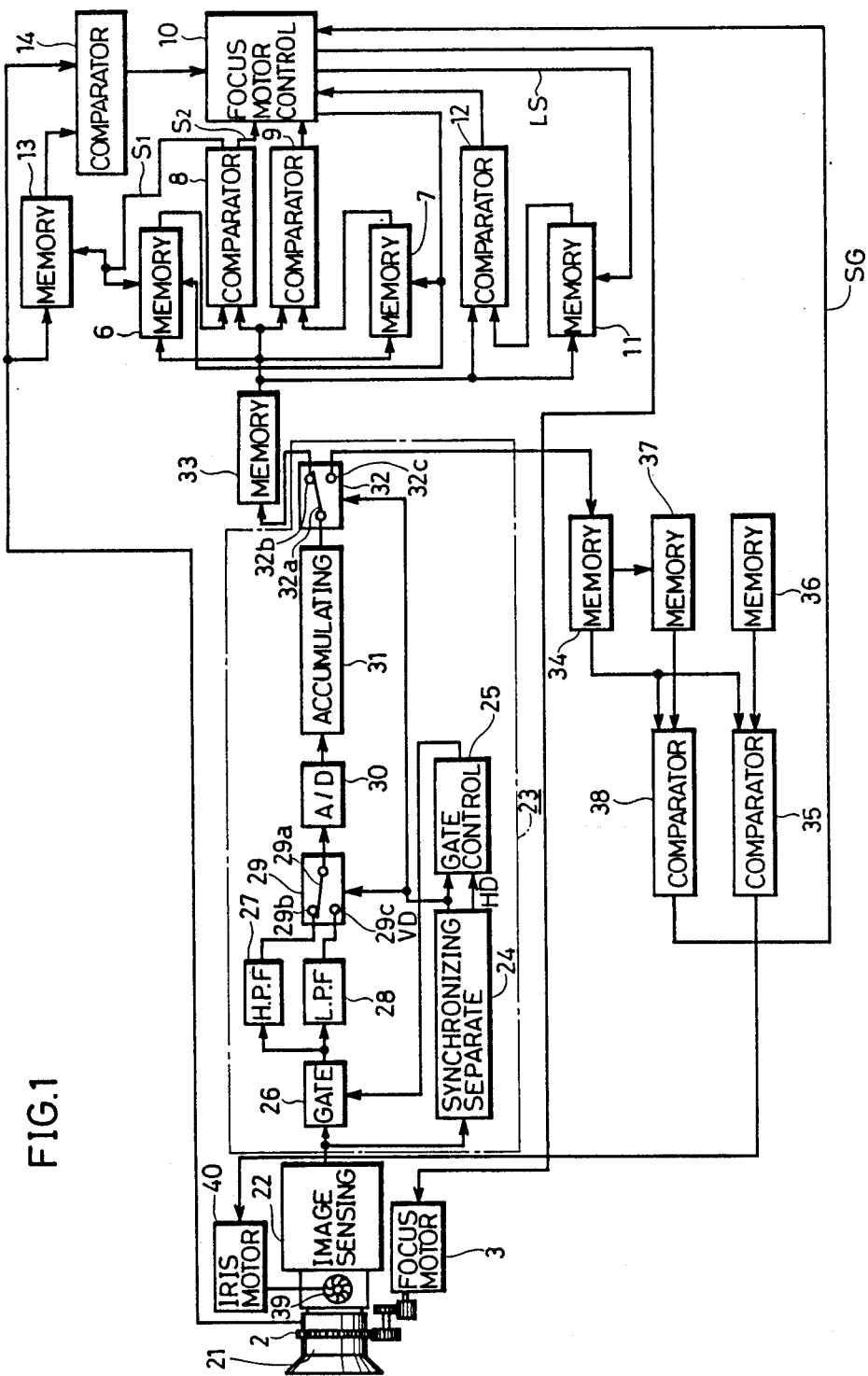
FIG. 1 is a schematic block diagram showing a video camera according to one embodiment of the present invention.

FIG. 1 is a schematic block diagram showing a video camera according to one embodiment of the present invention.

Referring now to FIG. 1, one embodiment of the present invention will be described. In FIG. 1, a video camera comprises a focusing ring 2 for moving a focusing lens 21, a focusing motor 3 for driving the focusing ring 2, and an image sensing circuit 22 including an image sensor (not shown) such as a CCD. The focusing lens 21 may be moved by a piezoelectric element instead of a motor. In addition, the image sensor itself such as the CCD instead of the focusing lens may be moved by a piezoelectric element. An image formed on the image sensor by the focusing lens 21 is converted into a video signal by the image sensing circuit 22, so that a component of a luminance signal therein is inputted to an evaluating value generating circuit 23. The component of the luminance signal inputted to the evaluating value generating circuit 23 is applied to a synchronizing separator circuit 24 and a gate circuit 26. The synchronizing separator circuit 24 separates a vertical synchronizing signal VD and a horizontal synchronizing signal HD from the inputted luminance signal, to apply the same to a gate control circuit 25. The gate control circuit 25 is responsive to the vertical synchronizing signal VD and the horizontal synchronizing signal HD as inputted and a fixed output of an oscillator (not shown) for setting a rectangular sampling area in the central portion of a picture. The gate control circuit 25 applies a signal for opening or closing a gate every field to the gate circuit 26 such that the passage of the luminance signal is permitted only within the range of this sampling area.

The gate circuit 26 supplies only a luminance signal corresponding to the range of the sampling area to a high-pass filter (HPF) 27 and a low-pass filter (LPF) 28 every field. The high frequency component separated by the HPF 27 and a low frequency component separated by the LPF 28 are alternatively selected by a switching circuit 29, to be applied to an A/D converter 30. The above described high frequency component or low frequency component applied to the A/D converter 30 are sequentially A-D converted, and further accumulated every one field by an accumulating circuit 31.

Figure 2:
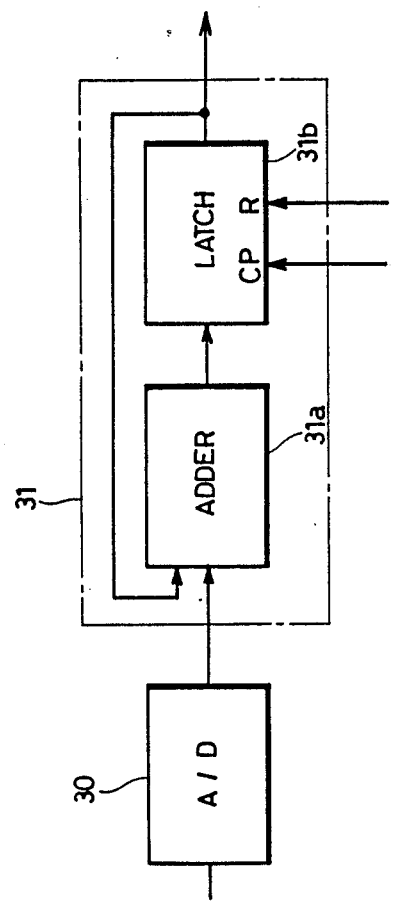
FIG. 2 is a block diagram showing the details of an accumulating circuit in the video camera shown in FIG. 1.

FIG. 2 is a block diagram showing specifically the accumulating circuit 31. In FIG. 2, the accumulating circuit 31 comprises an adder 31a and a latch circuit 31b. The adder 31a adds an output of the A/D converter 30 and an output of the latch circuit 31b every sampling output of the A/D converter 30. The latch circuit 31b latches an output obtained by addition. A clock for determining latch timing and a reset signal every one field are formed in response to the vertical synchronizing signal VD, the horizontal synchronizing signal HD and the fixed output of the oscillator in the gate control circuit 26, to be applied to the latch circuit 31b.

An accumulated value corresponding to one field obtained by the accumulating circuit 31 is alternately outputted to memories 33 and 34 by a switching circuit 32 controlled to be switched every one field. More specifically, the above described switching circuits 29 and 32 are both switched in synchronization with the vertical synchronizing signal VD obtained from the synchronizing separator circuit 24 such that if respective movable contact 29a and 32a of the switching circuits are on the side of fixed terminals 29b and 32b in a given field, they are on the side of fixed terminals 29c and 32c in the next field. Thus, the high frequency component separated by the HPF 27 is inputted to the memory 33 through the fixed terminal 32b while the low frequency component separated by the LPF 28 is inputted to the memory 34 through the fixed terminal 32c, so that the respective contents of the memories 33 and 34 are updated every two fields, i.e., every one frame. Thus, an accumulated value held in the memory 33 corresponding to one field of the high frequency component of the luminance signal in the sampling area is used as a focus evaluating value for automatic focusing control. On the other hand, an accumulated value held in the memory 34 corresponding to one field of the low frequency component of the luminance signal in the sampling area is used as an exposure evaluating value for automatic iris control.

An automatic focusing operation performed using the above described focus evaluating value will be described in detail. Description is made on an operation to occur immediately after automatic focusing control is started. Immediately after the automatic focusing operation is started, a focus evaluating value corresponding to the first one field outputted from the evaluating value generating circuit 23 and held in the memory 33 is first applied to a maximum value memory 6 and an initial value memory 7 and held therein. Thereafter, a focusing motor control circuit 10 rotates the focusing motor 3 in a predetermined direction. Thereafter, a comparator 9 compares the initial focus evaluating value held in the initial value memory 7 with the current focus evaluating value outputted from the evaluating value generating circuit 23 and held in the memory 33 to generate a comparison signal. The focusing motor control circuit 10 responsively initializes the rotational direction of the focusing motor 3.

More specifically, the focusing motor control circuit 10 rotates the focusing motor 3 in the above described predetermined direction until the comparator 9 generates a comparison output indicating "large" or "small". If and when a comparison output indicating that the current focus evaluating value is larger than the initial focus evaluating value held in the initial value memory 7 is outputted from the comparator 9, the focusing motor control circuit 10 maintains the above described predetermined rotational direction. On the other hand, when a comparison output indicating that the current focus evaluating value is smaller than the initial focus evaluating value, the focusing motor control circuit 10 reverses the rotational direction of the focusing motor 3.

In the above described manner, initialization of the rotational direction of the focusing motor 3 is completed. Thereafter, the focusing motor control circuit 10 monitors an output of the comparator 8. Meanwhile, in order to prevent a malfunction due to noises of the focus evaluating value, the comparator 9 may be adapted not to generate the comparison output indicating "large" or "small" while the difference between the initial focus evaluating value and the current focus evaluating value does not exceed a predetermined threshold value.

On the other hand, the comparator 8 compares the maximum focus evaluating value so far held in the maximum value memory 6 with the current focus evaluating value outputted from the evaluating value generating circuit 23 and held in the memory 33, to output two kinds of comparison signals (S1, S2), that is, signals in first and second modes in which the current focus evaluating value is larger or decreased to be below a predetermined threshold value, as compared with the focus evaluating value held in the maximum value memory 6, respectively. If and when the current focus evaluating value is larger than the content of the maximum value memory 6, the content of the maximum value memory 6 is updated in response to the output (S1) of the comparator 8, so that the maximum value of the focus evaluating value so far is always held in the maximum value memory 6.

A focusing ring position signal is generated from the focusing ring 2, corresponding to the position of the focusing ring 2 supporting the focusing lens 21. The focusing ring position signal is applied to a focusing ring position memory 13. The focusing ring position memory is updated to always hold the focusing ring position signal obtained when the focus evaluating value is the maximum, in response to the output (S1) of the comparator 8.

The focusing motor control circuit 10 monitors the output of the comparator 8 while rotating the focusing motor 3 in the direction initialized in response to the output of the comparator 9 as described above. When the comparison output (S2) in the second mode indicating that the current focus evaluating value is decreased to be below the above described threshold value is obtained from the comparator 8, the focusing motor control circuit 10 reverses the rotational direction of the focusing motor 3. It is to prevent a malfunction due to noises of a focus evaluating value that it is not until the current focus evaluating value is decreased to be below a predetermined threshold value that the focusing motor is reversed.

After the focusing motor 3 is reversed, a comparator 14 compares the content of the focusing ring position memory 13 corresponding to the maximum value of the focus evaluating value with the current focusing ring position signal generated from the focusing ring 2. When both coincide with each other, that is, when the focusing ring 2 is returned to the position where the focus evaluating value is the maximum, the focusing motor control circuit 10 stops rotation of the focusing motor 3. At the same time, the focusing motor control circuit 10 outputs a lens stop signal LS. In the above described manner, a series of automatic focusing operations are completed.

When the comparator 8 determines that the difference between focus evaluating values in continuous two frames becomes a large value exceeding a fluctuation allowable value $\Delta R$) previously set while the position of a lens approaches the position corresponding to the maximum evaluating value, the focusing motor control circuit 10 determines that an object moved. Thus, the focusing motor control circuit 10 operates to perform again the automatic focusing operation from the beginning.

A memory 11 and a comparator 12 are used for resuming an automatic focusing operation by the focusing motor control circuit 10 if the focus evaluating value changes in excess of a predetermined threshold value when the focusing lens is stopped. More specifically, a focus evaluating value at the time point when the automatic focusing operation by the focusing motor control circuit 10 is terminated and the lens stop signal LS is generated is held in the memory 11. The comparator 12 compares the content of the memory 11 with the current focus evaluating value outputted from the evaluating value generating circuit 23 and held in the memory 33. If the difference therebetween exceeds a predetermined threshold value ($\Delta R2$), it is considered that an object changed, so that a signal indicating that an object changed is applied to the focusing motor control circuit 10. As a result, the automatic focusing operation by the focusing motor control circuit 10 is resumed, so that the automatic focusing operation following the change in the object is achieved.

An automatic iris operation performed using the above described exposure evaluating value will be described in detail. In FIG. 1, an exposure evaluating value corresponding to the newest one field outputted from the evaluating value generating circuit 23 and held in a memory 34 is applied to one input of a comparator 35. The comparator 35 compares a reference exposure evaluating value previously set in a memory 36 and corresponding to the most suitable value of the amount of light inputted to an image sensor with the newest exposure evaluating value applied from the memory 34. An error signal corresponding to the difference between the reference exposure evaluating value and the newest exposure evaluating value is applied to an iris motor 40, so that a stop-down mechanism 39 is operated. As a result, the amount of light inputted to the image sensor is adjusted such that the exposure evaluating value always becomes the reference exposure evaluating value.

In addition, the above described error signal may be applied to a video signal AGC circuit (not shown) to adjust the gain of the video signal.

On the other hand, the newest exposure evaluating value held in the memory 34 is transferred to a memory 37 every one frame. The contents of the memories 34 and 37 are applied to a comparator 38. The comparator 38 compares an exposure evaluating value in the current field with an exposure evaluating value detected two fields before. As a result of the comparison by the comparator 38, when it is determined that the difference exceeding a fluctuation allowable width ($\Delta I$) previously set appears between the exposure evaluating value in the current field and the exposure evaluating value detected two fields before, it is considered that the amount of light inputted to the image sensor suddenly changes, for example, extremely increases or decreases, so that the comparator 38 generates a "light and darkness change signal SG" of an "H" level to apply the same to the focusing motor control circuit 10.

The light and darkness change signal SG acts on the above described automatic focusing operation in the following manner. More specifically, if and when the above describe light and darkness change signal SG is inputted to the focusing motor control circuit 10 while the focusing motor 3 is driven by the focusing motor control circuit 10 so that the current focus evaluating value approaches the maximum focus evaluating value, the focusing motor control circuit 10 resets the memories 6, 7 and 13 to stop the automatic focusing operation while the light and darkness change signal SG is inputted. When the sudden change in the exposure evaluating value becomes small and the light and darkness change signal SG is no longer inputted to the focusing motor control circuit 10, the focusing motor control circuit 10 applies again a focus evaluating value held in the memory 33 to initialize the direction of driving the focusing motor 3, so that the automatic focusing operation is performed again from the beginning.

Additionally, considering a case in which the above described light and darkness change signal SG is inputted to the focusing motor control circuit 10 at the time point when the focusing motor is in a stopped state, so that the focusing motor control circuit 10 monitors the movement of an object in response to an output of the comparator 12, even if the comparator 12 determines that the object changed while the light and darkness change signal SG is inputted, resumption of the automatic focusing operation by driving the focusing motor 3 is prohibited.

As described in the foregoing, according to one embodiment of the present invention, a focus evaluating value and an exposure evaluating value are obtained from a video signal obtained from an image sensor in the same sampling area set on a picture to use an automatic focusing operation and an automatic iris operation, erroneous detection of the in-focus position and the unnecessary start of the automatic focusing operation due to the effect of the change in light and darkness of an object on the automatic focusing operation can be prevented by detecting the change in light and brightness of the object based on fluctuations in exposure evaluating value. As a result, exposure most suitable for an object which is precisely focused can be obtained, so that a good reproduced image can be obtained.

Figure 3:
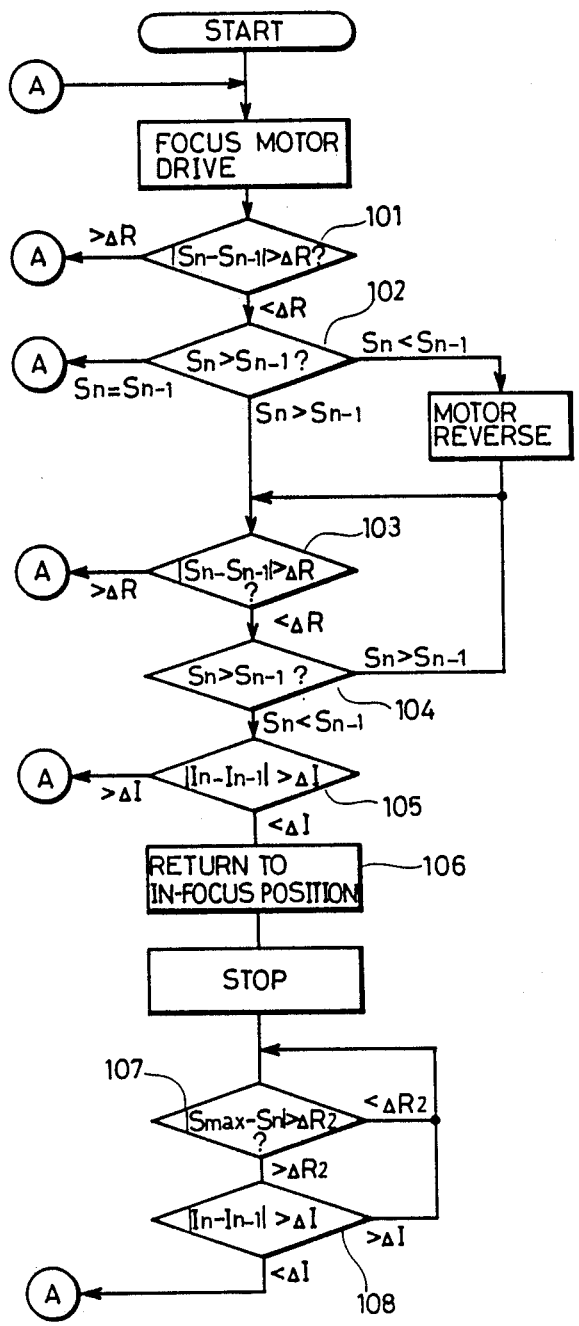
FIG. 3 is a flow chart in a case in which a focusing motor control circuit shown in FIG. 1 is processed in a software manner by using a microcomputer.

Meanwhile, an operation of the focusing motor control circuit 10 shown in FIG. 1 can be processed in a software manner by using a microcomputer. FIG. 3 is a flow chart for explaining such processing. In FIG. 3, $S_n$ and $I_n$ denote the current focus evaluating value and exposure evaluating value, respectively. $S_{n-1}$ and $I_{n-1}$ denote a focus evaluating value and an exposure evaluating value detected one frame before, respectively, and Smax denotes the maximum focus evaluating value.

In FIG. 3, after the focusing motor is driven, when the absolute value of the difference between focus evaluating values in continuous two frames becomes a large value exceeding a fluctuation allowable value $\Delta R$ previously set so that it is determined that an object moved in the step 101, the automatic focusing operation is performed again from the beginning.

Then, the step 102 corresponds to initialization of the rotational direction of the focusing motor 3 performed using the memory 7 and the comparator 9 shown in FIG. 1. When the focus evaluating value in the current field is small, the rotational direction of the focusing motor 3 is reversed. In addition, the step 103 shows control performed when the movement of the object is detected, similarly to the above described step 101.

Then, the step 104 corresponds to detection of the maximum value of the focus evaluating value performed using the memory 6 and the comparator 8 shown in FIG. 1. When the focus evaluating value in the current field is smaller, the rotational direction of the focusing motor 3 is reversed in the step 106, so that the focusing lens is returned to the position where the focus evaluating value takes the maximum value, i.e., the in-focus position.

While the above described focusing motor is driven, when a large change of the exposure evaluating value exceeding the fluctuation allowable width $\Delta I$ is determined, the microcomputer stops the automatic focusing operation and performs again the same from the beginning.

Furthermore, while the focusing lens is stopped, the automatic focusing operation is resumed, as a general rule, when it is determined that the change in the focus evaluating value exceeds a threshold value $\Delta R2$ in the step 107, while the automatic focusing operation is not resumed when a large change in the exposure evaluating value exceeding the fluctuation allowable width $\Delta I$ in the step 108.

In the embodiment shown in FIG. 1, the switching circuits 29 and 32 are controlled to be switched every one field, so that both the A/D converter 30 and the accumulating circuit 31 are used for detecting the focus evaluating value and the exposure evaluating value. Thus, comparison between the evaluating values by each comparator is made in response to data every two fields, i.e., every one frame. However, dedicated A/D converters and accumulating circuits are provided for calculating the focus evaluating value and the exposure evaluating value, so that the automatic focusing operation and the automatic iris operation can be performed with a higher precision in response to the evaluating value every one field.

Although in the above described embodiment, the exposure evaluating value is calculated by extracting the low frequency component of the luminance signal in the sampling area by the LPF 28 to A-D convert the same and further accumulating converted data corresponding to one field, the luminance signal may be directly inputted to the A/D converter 30 without passing through the LPF 28, to perform A-D conversion over the entire band of the luminance signal and calculate the same.

Figure 4:
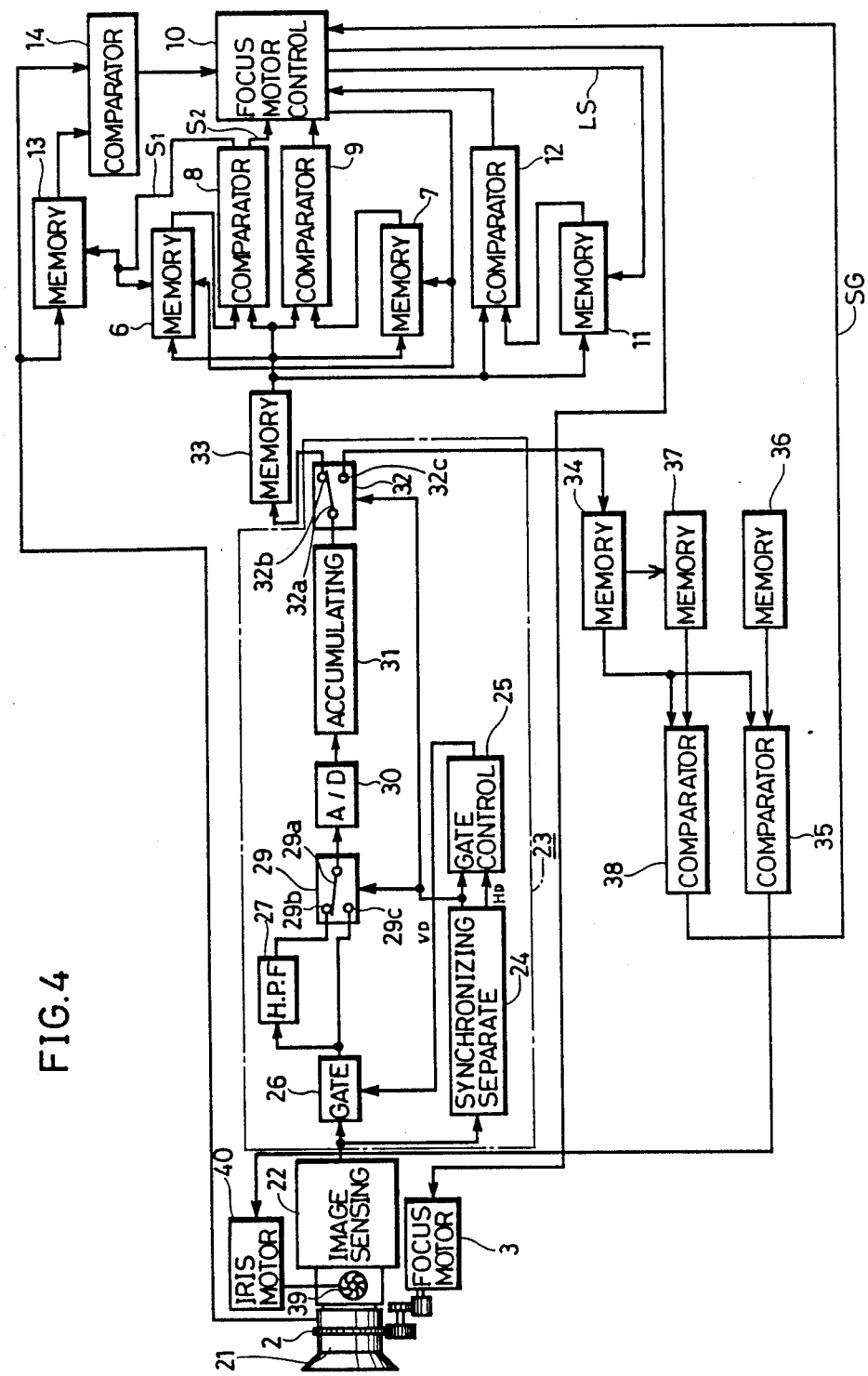
FIG. 4 is a schematic block diagram showing a video camera according to another embodiment of the present invention.

FIG. 4 shows an embodiment in which A-D conversion is performed over the entire band of the luminance signal to calculate the exposure evaluating value as described above, which differs from the embodiment shown in FIG. 1 in that the LPF 28 is not provided so that an output of the gate circuit 26 is directly applied to the A/D converter 30.

Although in the above described embodiment, description was made on a case in which a signal which takes the maximum value in the in-focus position is used as a focus evaluating value, a signal which takes the minimum value in the in-focus position may be used as a focus evaluating value and a circuit for detecting the minimum value may be provided to perform control such that the minimal value of the detected value is maintained, in which case the same effect can be obtained.

Additionally, although in the above described embodiment, the focusing ring position signal generated from the focusing ring 2 is held in the focusing ring position memory 13 so that a focusing ring position signal corresponding to the maximum value of the focus evaluating value and the current focusing ring position signal are compared with each other by the comparator 14, the focusing motor position signal may be detected from the focusing motor 3 to be substituted for the focusing ring position signal, in which case the same effect can be obtained.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image sensing apparatus, comprising:
    image sensing means having a focusing lens and an image sensor for supplying a video signal obtained from the image sensor including a luminance signal,
    means for setting a particular area on an image sensing picture,
    relative position changing means for changing the relative positional relation in the direction of an optical axis of said focusing lens relative to said image sensor,
    stop-down means for adjusting the amount of light which is incident on said image sensor,
    focus evaluating value detecting means for detecting every constant time period a level of a high frequency component of the video signal obtained from the image sensor in said particular area and converting the level into a focus evaluating value to supply the same,
    exposure evaluating value detecting means for detecting every constant time period a luminance level of the video signal obtained from the image sensor in said particular area and converting the level into an exposure evaluating value to supply the same,
    automatic focusing control means responsive to said focus evaluating value for controlling said relative position changing means such that the positional relation of said focusing lens relative to said image sensor is held in an in-focus state, and
    automatic iris control means responsive to said exposure evaluating value for controlling said stop-down means such that the amount of light which is incident on said image sensor is held to be tee most suitable reference amount of light.

2. The image sensing apparatus according to claim 1, wherein said focus evaluating value is a focus evaluating value which takes the maximum value in the in-focus position.

3. The image sensing apparatus according to claim 1, wherein said focus evaluating value is a focus evaluating value which takes the minimum value in the in-focus position.

4. The image sensing apparatus according to claim 1, wherein the luminance level of said video signal obtained from the image sensor is a level of a signal including at least a low frequency component of a luminance signal in said video signal obtained from the image sensor.

5. The image sensing apparatus according to claim 4, which further comprises
    means for determining that said exposure evaluating value fluctuated over a predetermined width or more, and
    means for prohibiting an operation of said automatic focusing control means when fluctuations in the exposure evaluating value are determined by said determining means.

6. The image sensing apparatus according to claim 5 wherein means for determining the fluctuations of said exposure evaluating value comprises
    first and second storing means for storing two exposure evaluating values obtained every said constant time period, and
    first comparing means for comparing said two exposure evaluating values stored in said first and second storing means.

7. The image sensing apparatus according to claim 5, wherein
    said focus evaluating value detecting means comprises
    high-pass filter means for extracting the level of the high-frequency component of the video signal obtained from the image sensor in said particular area,
    first A/D converter means for A-D converting the level of the high frequency component extracted by said high-pass filter means, and
    first accumulating means for accumulating every said constant time period said A/D converted level of the high frequency component, and
    said exposure evaluating value detecting means comprises
    means for extracting a luminance level of the video signal obtained from the image sensor in said particular area,
    second A/D converter means for A-D converting said extracted luminance level, and
    second accumulating means for accumulating every said constant time period said A-D converted luminance level.

8. The image sensing apparatus according to claim 7, wherein single A/D converter means is used as both said first and second A/D converter means and single accumulating means is used as both said first and second accumulating means, and which further comprises,
    first switching means which is switched such that said extracted level of the high frequency component or said extracted luminance level are alternatively applied to said single A/D converter means every said constant time period, and
    second switching means which is switched such that the level of the high frequency component and the luminance level accumulated by said single accumulating means are alternately applied to said automatic focusing control means and said automatic iris control means, respectively, every said constant time period.

9. The image sensing apparatus according to claim 7, wherein means for extracting said luminance level comprises low-pass filter means for extracting a low frequency component of the luminance signal in the video signal obtained from the image sensor in said particular area.

10. The image sensing apparatus according to claim 7, wherein said particular area setting means comprises
- gate means for passing said video signal obtained from the image sensor.
- synchronizing signal separator means for separating a vertical synchronizing signal and horizontal synchronizing signal from said video signal, and
- means for applying every said constant time period a signal for opening or closing said gate means such that the passage of said video signal obtained from the image sensor is allowed only within an area set in response to said vertical synchronizing signal and said horizontal synchronizing signal separated by said synchronizing signal separator means.

11. The image sensing apparatus according to claim 10, wherein said particular area is set in the center of said image sensed picture.

12. The image sensing apparatus according to claim 5 wherein said relative position changing means comprises a focusing ring and focusing motor for moving said focusing lens in the direction of the optical axis.

13. The image sensing apparatus according to claim 5, wherein said relative position changing means comprises a piezoelectric element for moving said focusing lens or said image sensor in the direction of the optical axis.

14. The image sensing apparatus according to claim 5, wherein said constant time period is a time period corresponding to one field of said video signal.

* * * * *